No. 824,658. PATENTED JUNE 26, 1906.
O. JUNGGREN.
GOVERNING VALVE MECHANISM FOR TURBINES.
APPLICATION FILED APR. 29, 1903. RENEWED MAR. 23, 1906.

2 SHEETS—SHEET 1.

WITNESSES:
George A. Thornton.
Benjamin B. Hull

INVENTOR:
Oscar Junggren.
by Allen S. Dana
Atty.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

GOVERNING-VALVE MECHANISM FOR TURBINES.

No. 824,658.      Specification of Letters Patent.      Patented June 26, 1906.

Original application filed August 26, 1902, Serial No. 121,110. Divided and this application filed April 29, 1903. Renewed March 23, 1906. Serial No. 307,723.

*To all whom it may concern:*

Be it known that I, OSCAR JUNGGREN, a citizen of the United States, residing at Schenectady, county of Schenectady, State of New York, have invented certain new and useful Improvements in Governing-Valve Mechanism for Turbines, of which the following is a specification.

The present invention is a division of my pending application, Serial No. 121,110, filed August 26, 1902, which division is made at the requirement of the United States Patent Office under the provisions of Rules 41 and 42.

For certain purposes it is desirable to provide an automatic valve which is controllable from a distance more or less great for connecting and disconnecting a source of fluid-supply from a consumption device, and this with a minimum expenditure of energy. Such a valve is particularly useful in governing the admission of elastic fluid to a turbine, since by its use the load on the governor can be reduced to a minimum.

My invention has for its object to improve the construction of valves of the above-mentioned type, and my improvements are directed more particularly toward the secondary valve and its actuating means which control the main valve, whereby all packings are eliminated and the parts are mechanically simplified.

For a consideration of what I consider to be novel and my invention attention is called to the accompanying description and claims appended thereto.

Figure 1:
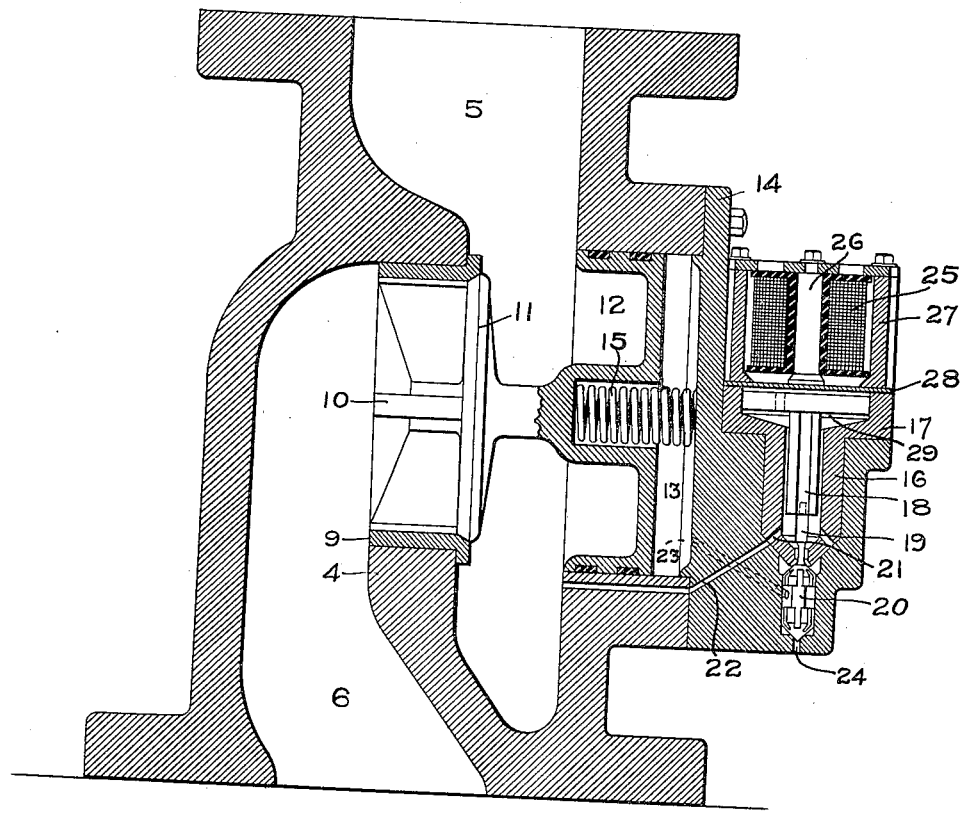
Figure 3:
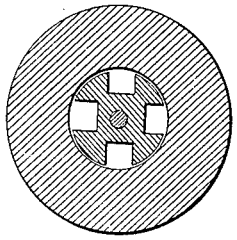
Figure 2:
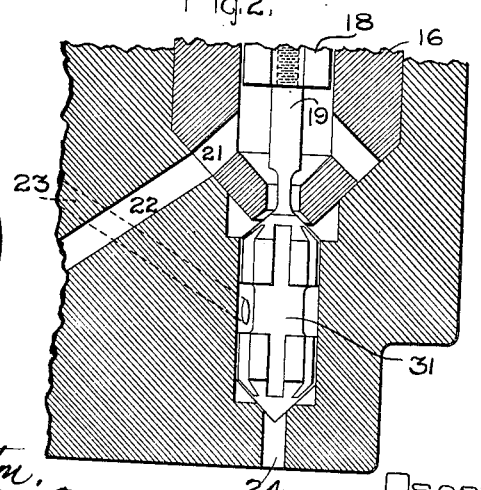
Figure 4:
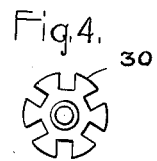
Figure 5:
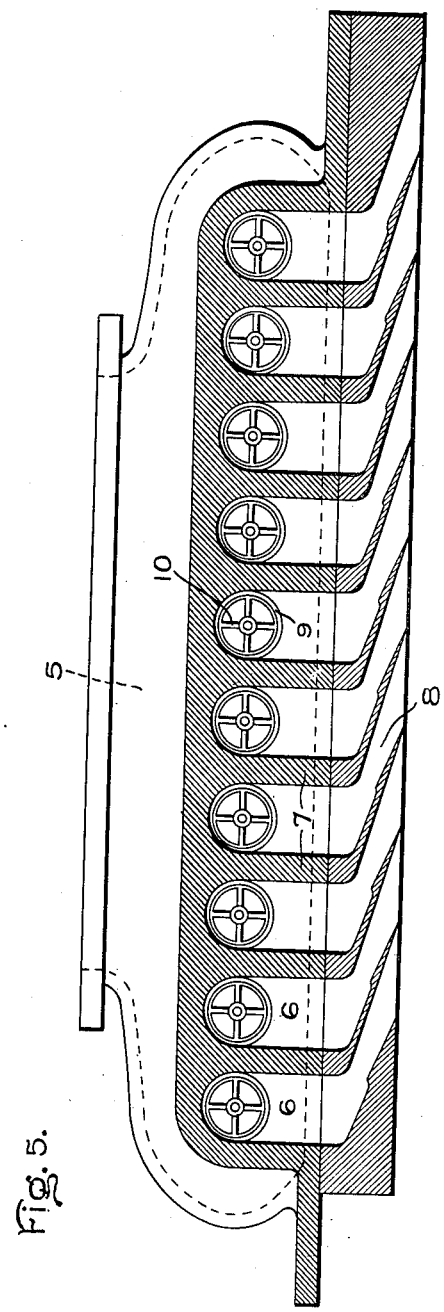

In the accompanying drawings, which represent one embodiment of my invention, Figure 1 is a vertical section of a valve. Fig. 2 is an enlarged partial section of the secondary valve. Fig. 3 is an enlarged cross-section of the secondary valve. Fig. 4 is an end view of the secondary valve, and Fig. 5 is a section, at right angles to that of Fig. 1 and on a smaller scale, of the valve-chest, showing a plurality of valves.

Each valve in the present illustration is under the control of an electromagnet 25 and is independent as to its operation of every other valve in the same group. All of the main or nozzle valves being similar in construction, a description of one of them will be sufficient. This similarity of construction is highly desirable, as the parts for a given size are interchangeable and the cost of construction is greatly decreased. Moreover, the arrangement of a number of individual valves electrically operated or controlled for regulating the delivery of a body of fluid affords a great mechanical simplification.

The casing is divided into two principal parts or chambers by the partition 4. The upper part or chamber 5 is common to all of the main or nozzle valves, while the lower part is subdivided into a plurality of separate chambers or passages 6, each of which is cut into or out of service by a main valve. The division of the lower part of the casing into a plurality of independent chambers is best shown in Fig. 5, wherein 7 represents the partition between the adjacent sections, which sections may lead to the devices that are being controlled. In the present illustration the upper chamber 5 communicates with the boiler or other source of supply, while the lower individual chambers are each connected with a nozzle or other passage 8 for receiving and discharging motive fluid.

The partition is bored out to receive the sleeve 9, the latter being provided with a valve-receiving seat. The valve is provided with four projections 10, which engage with the sleeve 9 and act as guides therefor, so as to seat it accurately. When the valves are employed for governing turbines, it is of the utmost importance that all of them be capable of completely shutting off all of the individual chambers 6, which are connected to the nozzles; otherwise the turbine is liable to race when the load is thrown off. Formed on the back of the valve is a rod which connects it with the motor-piston 12, the latter being larger that the valve and provided with the usual packing-rings to prevent leakage. The piston and its cylinder are in line with the valve and are completely inclosed by the casing, so that packings and glands are obviated. The motors and their controlling-valves are under the control of electromagnets, as will hereinafter appear, and when for any reason the magnets are deënergized the main valves controlling the admission of steam to the chambers 6 will automatically close. This precaution is obviously advantageous, since it prevents accidents. The right-hand end of the cylinder 13 is closed in by a head 14, which carries the secondary valve and the magnet for operating it. This head also acts as a stationary abutment for the compression-spring 15, which tends at all times to close the main or nozzle valve 11. I find that this spring is necessary in order to insure the quick starting of the motor into operation when steam is admitted to its cylinder. When the main valve is wide open, the fluid-pressures on opposite sides of the piston and valves are balanced, and without the spring the valve could not close; but as soon as the valve moves a certain distance toward its conical seat its balanced condition is upset and the valve quickly closes. These motors are double acting and are so arranged that they utilize the motive fluid from the main chamber 5. In other words, they are connected to the inlet or high-pressure side of the apparatus. The head 14 is bolted or otherwise secured to the valve-casing and is provided with an enlargement which is bored out to receive the tubular extension 16 of the casing 17, the latter forming a part of the secondary-valve mechanism. The lower end of the tubular extension is beveled, so as to make a tight fit with the head around the ports and prevent the escape of steam. Mounted within the casing and suitably guided is a moving element or actuator 18, having an enlarged head and downwardly-extending portion, the latter being screw-threaded to a stem 19 of the double-acting secondary valve 20. The lower end of the cylindrical extension 16 is provided with a conical valve-seat that is arranged to engage with the upper end of the secondary valve 20. It is also provided with one or more ports or openings 21, which communicate with the passage 22 and admit live steam or other fluid under pressure to the back of the motor-piston 12 when it is desired to close the main valve 11. The lower end of the secondary valve is made conical and arranged to seat on a conical surface formed on the plate 14. Communicating with this valve-seat is an exhaust-port 24, which may communicate with atmosphere or with the low-pressure side of a turbine or other structure receiving steam. The secondary or motor-controlling valve 20 is double acting—that is to say, it is employed to control the admission of steam to the cylinder 13 and also to control the exhaust therefrom to the ports 23 and 24.

Situated above the casing 17 is an electromagnet 25, having a cylindrical core 26 and side pole-pieces 27, which present their ends to the casing. Between the magnet and the casing is a thin non-magnetic plate 28, which prevents the armature from sticking to the pole-pieces. This plate makes a tight fit with the upper end of the casing 17 and in this manner prevents the escape of steam or other motive fluid which fills the chamber 29 when the parts are in the position shown. The enlarged head of the moving element 18 constitutes an armature for the magnet and is provided with one or more openings, as shown in dotted lines, so as to equalize the pressures above and below it. When the magnet is energized, the magnetic flux or lines of force pass through the plate 28 and the head is attracted, which raises the secondary valve 20 and opens the cylinder 13 to the exhaust, at the same time closing it to the live-steam entrance, thus unbalancing the pressures on the piston 12. The double-acting secondary valve is arranged after the manner of a piston-valve and has a plurality of guides 30 formed on the periphery. Between the guides are slots which communicate with a portion 31 of reduced size. The object of this arrangement is to permit the steam to freely pass the valve under certain conditions. The ends of the valves are made conical and are adapted to engage with conical seats. The upper seat is formed on the cylindrical extension 16 and the lower seat on the plate 14.

It is to be noted that the main valve and the motor are entirely inclosed and that there are no valve-stems or other parts projecting through the casing requiring packing. It is also to be noted that the secondary valve is entirely inclosed. Hence the use of packings is obviated. These features are important, because they render it possible to reduce the leakage and at the same time decrease the cost of maintenance. This arrangement also lessens the cost of attendance.

The action of each valve is as follows: When the circuit of the magnet is energized, it raises the secondary or motor-controlling valve 20 and cuts off the supply of live steam or other motive fluid to the cylinder 13. At the same time the exhaust-port 24 is uncovered, and the fluid remaining in the motor-cylinder is permitted to escape through the passage 23. (Shown in dotted lines.) The diameter of the motor-piston 12 being greater than that of the nozzle-valve 11, the latter will automatically open as soon as the pressure on the back of the piston is decreased to a certain extent. As soon as the main valve is opened steam will pass from the main chamber 5 into the small chamber or passage 6, thence to the nozzle or other device arranged to receive fluid. When for any reason it is desired to cut off the supply of fluid to one of the chambers, the magnet is deënergized, which permits the secondary or motor-controlling valve 20 to drop under the action of gravity or its equivalent and close the exhaust-port 24, at the same time admitting live steam to the motor-cylinder 13 through the passages 22 and 23. The piston will then move forward under the action of the fluid and the compression-spring 15 and close the main valve, thereby interrupting the supply of fluid to the chamber 6.

It is evident from the foregoing that the secondary valve creates a balanced or unbalanced condition as to pressures on the piston 12, the pressures being balanced, or substantially so, for closing and unbalanced for opening.

In accordance with the provisions of the patent statutes I have described the principle of my invention, together with the apparatus which I now consider to represent the best embodiment thereof; but I desire to have it understood that the apparatus shown is merely illustrative and that the invention can be carried out in other ways.

What I claim as new, and desire to secure by Letters Patent of the United States, is—

1. In combination, a casing having a valve mounted therein, a mass of magnetic material secured to the valve and located within the casing, a magnet having poles mounted on the outside of the casing, which acts on said mass, and a transversely-extending plate of non-magnetic material located between the ends of the magnet-poles and the mass which prevents the escape of fluid.

2. In combination, a valve, a casing therefor, a motor for actuating the valve, the valve and motor being entirely inclosed by the casing, a secondary valve for regulating the admission of fluid to the motor, a mass of magnetic material secured to the secondary valve and in contact with the motive fluid, and a magnet having pole-pieces situated on the outside of the casing and presenting the ends of the poles thereto, the flux or lines of force of which pass through the casing and act on the mass of magnetic material.

3. In combination, a valve-casing having a main chamber, a plurality of secondary chambers opening into the main chamber, separately-actuated valves located between the main and secondary chambers for cutting the secondary chambers into and out of service, and means for actuating the valves independently of each other.

4. In a valve, the combination of a casing, a main valve mounted therein, a piston and cylinder for opening and closing the valve, a detachable head which closes in the cylinder, a spring situated between the head and the piston, a double-acting secondary valve for creating a balanced or unbalanced condition as to pressures on the piston, seats situated at the ends of the secondary valve, a mass of magnetic material attached to the secondary valve and supported by the head, a plate of non-magnetic material which covers the said mass and prevents the escape of motive fluid, and a magnet having pole-pieces which present their ends to the plate so that the flux can pass through it to said mass.

5. In a valve, the combination of a casing, a valve mounted therein, a piston and a cylinder for moving the valve, a head for closing the cylinder which is provided with a projection or enlargement, a secondary valve-casing having a tubular extension which is mounted in the enlargement, a secondary valve, a seat formed on the extension for the secondary valve, an actuator for the valve which passes through the extension, and means for moving the actuator.

6. In a valve, the combination of a casing, a valve mounted therein, a piston and a cylinder for moving the valve, a means for closing in one end of the cylinder, a double-acting secondary valve mounted in said means, a valve-stem having an enlargement made of magnetic material at one end, a non-magnetic plate which covers the enlargement and prevents the escape of steam, an electromagnet resting on the plate, and pole-pieces for the magnet which present their ends to said plate and the enlargement.

7. In combination, a valve-casing containing a main chamber and a plurality of secondary chambers or passages, individual motor-operated valves located between the main and secondary chambers which control the passage of fluid from the main to the several secondary chambers or passages, relay or secondary valves for controlling the motor-operated valves, and means for operating the relay or secondary valves in any predetermined manner.

8. In combination, a valve-casing having a main chamber, a plurality of secondary chambers opening into the main chamber, separately-actuated valves located between the main and secondary chambers for cutting the latter into and out of communication with the main chamber, and magnets controlling the opening and closing of the valves, which are arranged to permit the valves to close when the continuity of their circuits is interrupted.

9. In combination, a valve-casing, a partition therein which divides the casing into main and secondary chambers, other partitions which divide the secondary chamber into a plurality of small individual chambers or passages, a number of separately-actuated valves located between the main and the small auxiliary chambers or passages for controlling the flow of fluid from one to the other, and means for controlling the valves.

10. In combination, a casing, partitions which divide the casing into main and secondary chambers, valves located between the main and secondary chambers, controlling the passage of fluid between them, pistons for actuating the valves, cylinders for the pistons, heads for the cylinders which are supported by the casing, and means for controlling the operation of the valves.

11. The combination of a casing, a main valve therein, a cylinder formed in one of the walls of the casing, a head for the cylinder, a piston guided by the cylinder and connected to the valve for actuating it, conduits for admitting fluid-pressure from the casing to the space between the piston and head and for exhausting it therefrom, a double-seated secondary valve in said head for controlling said conduits, and an actuator for the secondary valve.

12. The combination of a casing, a main valve therein, a motor for actuating the valve comprising a piston and cylinder, a chambered head for the cylinder which forms therewith a fluid-tight space behind the piston, conduits connecting the casing with the space behind the piston by way of the chamber in the head for admitting fluid-pressure to and exhausting it from said space, a secondary valve provided with conical seat-engaging ends for controlling said conduits and arranged in the chamber of the head to be removable therewith, and an actuator for the valve which is supported by the head and is removable therewith.

13. The combination of a valve-casing having a single admission-chamber and a plurality of discharge-chambers, valves corresponding in number to the discharge-chambers for controlling communication between them and the admission-chamber, an independent motor for each valve comprising a fluid-actuated piston and a cylinder therefor, a removable head for each cylinder, a fluid-controlling valve for each cylinder located in the head of the latter, and an electromagnet carried by and removable with each head for actuating the controlling-valve located within the same.

14. The combination of a casing, a main valve therein, a motor for actuating the valve comprising a piston and cylinder, a secondary mechanism for controlling the fluid-pressure acting on the piston, and a head for the cylinder which entirely supports the secondary mechanism and is removable therewith.

In witness whereof I have hereunto set my hand this 28th day of April, 1903.

OSCAR JUNGGREN.

Witnesses:
ALEX. F. MACDONALD,
HELEN ORFORD.